(12) United States Patent
Eurlings

(10) Patent No.: US 12,042,831 B2
(45) Date of Patent: Jul. 23, 2024

(54) PELLETIZING FACILITY FOR THE GENERATION OF SOLID RECOVERED FUEL PELLETS AND USE OF THE SAME IN TORREFACTION

(71) Applicant: RWE GENERATION NL B.V., Geertruidenberg (NL)

(72) Inventor: Johannes Theodorus Gerardus Marie Eurlings, Obbicht (NL)

(73) Assignee: RWE GENERATION NL B.V., Geertruidenberg (NL)

( * ) Notice: Subject to any disclaimer, the term of this patent is extended or adjusted under 35 U.S.C. 154(b) by 0 days.

(21) Appl. No.: 18/250,513

(22) PCT Filed: Oct. 25, 2021

(86) PCT No.: PCT/EP2021/079468
§ 371 (c)(1),
(2) Date: Apr. 25, 2023

(87) PCT Pub. No.: WO2022/090123
PCT Pub. Date: May 5, 2022

(65) Prior Publication Data
US 2023/0302510 A1    Sep. 28, 2023

(30) Foreign Application Priority Data
Oct. 29, 2020    (EP) .................................... 20204802

(51) Int. Cl.
*B09B 3/32*        (2022.01)
*B09B 3/35*        (2022.01)
(Continued)

(52) U.S. Cl.
CPC .................. *B09B 3/32* (2022.01); *B09B 3/35* (2022.01); *B09B 3/40* (2022.01); *B09B 2101/25* (2022.01)

(58) Field of Classification Search
CPC .......... B09B 2101/25; B09B 3/32; B09B 3/35; B09B 3/40; C10L 2290/08;
(Continued)

(56) References Cited

U.S. PATENT DOCUMENTS 5,387,267 A        2/1995   Warf et al.
2007/0266623 A1*   11/2007  Paoluccio ................. C10L 5/44
                                                    44/629
(Continued)

FOREIGN PATENT DOCUMENTS

EP        3184946      6/2017

OTHER PUBLICATIONS

International Application No. PCT/EP2021/079468—Patent Cooperation Treaty PCT Written Opinion of the International Searching Authority—Completed Jan. 5, 2022 (mailed Jan. 20, 2022).
(Continued)

*Primary Examiner* — Ellen M McAvoy
*Assistant Examiner* — Chantel Graham
(74) *Attorney, Agent, or Firm* — LOTT & FISCHER, PL

(57) ABSTRACT

The pelletizing facility (100) according to the present invention allows the manufacture of solid recovered fuel pellets from municipal solid waste without separating parts of the municipal solid waste before starting the pelletizing process. Thus, a higher amount of the municipal solid waste can actually be used to manufacture solid recovered fuel pellets. The pelletizing facility (100) as well as the method according to the invention can be used in particular to manufacture solid recovered fuel pellets that can be used in the production of hydrogen and/or carbon dioxide enriched syngas by a torrefaction of the solid recovered fuel pellets with a subsequent gas treatment.

5 Claims, 3 Drawing Sheets

Figure 1:
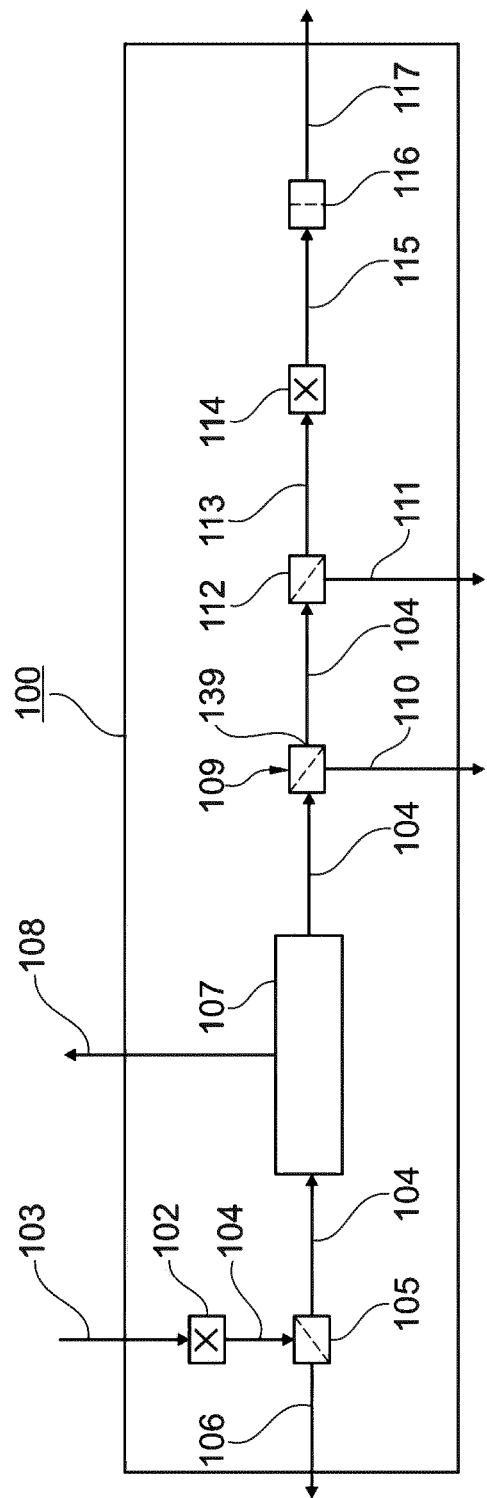

(51) Int. Cl.
*B09B 3/40* (2022.01)
*B09B 101/25* (2022.01)

(58) Field of Classification Search
CPC ............ C10L 2290/10; C10L 2290/28; C10L 2290/30; C10L 2290/38; C10L 2290/40; C10L 2290/54; C10L 5/46; Y02E 50/10; Y02E 50/30
See application file for complete search history.

(56) References Cited

U.S. PATENT DOCUMENTS

| | | | |
|---|---|---|---|
| 2011/0214341 A1* | 9/2011 | Nafid | C10L 5/46 |
| | | | 44/589 |
| 2013/0224486 A1* | 8/2013 | Branscomb | C08J 11/06 |
| | | | 264/211.21 |
| 2022/0315855 A1* | 10/2022 | Teng | C10L 9/086 |

OTHER PUBLICATIONS

International Application No. PCT/EP2021/079468—Patent Cooperation Treaty PCT International Search Report—Completed Jan. 5, 2022 (mailed Jan. 20, 2022).

European Search Report for Application No. EP 20 20 4802—Mar. 15, 2021.

European Search Opinion for Application No. EP 20 20 4802—Mar. 15, 2021.

* cited by examiner

PELLETIZING FACILITY FOR THE GENERATION OF SOLID RECOVERED FUEL PELLETS AND USE OF THE SAME IN TORREFACTION

This application is a national phase of PCT Application No. PCT/EP2021/079468 filed Oct. 25, 2021, the contents of which are hereby incorporated by reference.

Subject matter of the present invention is a method and a facility to produce solid recovered fuel pellets from municipal solid waste and the use of the same in torrefaction.

Municipal Solid Waste (MSW) is generated worldwide and has to be dealt with. In the western hemisphere municipal solid waste is either landfilled or incinerated. Incineration is focused on maximizing the use of the energy content of the municipal solid waste in contrast to recycling or reusing the contents of the municipal solid waste on a molecular scale as e.g. in chemical recycling. Incineration generates issues regarding the emission of pollutants into the atmosphere which results—depending on national or even local legislation—in significant technological efforts necessary to meet the limitations provided by national/local legislation. Further, the products generated by the incineration, e.g. fly ash, bottom ash, gypsum and heavy metal and/or dioxin laden active coal, create further challenges regarding their further use and/or processing. Furthermore, the waste to power efficiency, i.e. the amount of caloric value transferred to heat energy is low and is typically in a range of 20 to 25%. US 2011/021434 A1 discloses a method to prepare fuel pellets from municipal waste and using the same as fuel.

Alternatively, alternatives to incineration and landfill of municipal solid waste as such are discussed which rely mainly on the generation of solid recovered fuel (SRF) pellets from municipal solid waste to allow further processing, nevertheless, in preparing these pellets different limitations of legislations have to be observed, i.e. regarding the chlorine content, the ash content, heavy metal content and the respective heating value, as laid down in the European Standards EN 15359:2011. To fulfil e.g. this standard usually part of the municipal solid waste is separated e.g. to fulfil the chlorine limitations, e.g. by separating polyvinylchloride (PVC) and finer fractions, typically high in heavy metals, moisture, ash and biogenic fraction, from the municipal solid waste. Consequently, up to 40 weight-% [wt.-%] of municipal solid waste is lost for the production of solid recovered fuel pellets. Furthermore, the separation technology necessary requires considerable technological effort, and, thus, invest.

Based on this it is an object of the present invention to improve the technology for generating solid recovered fuel pellets from municipal solid waste.

This object is solved by the independent claims. Dependent claims are directed to embodiments of the invention.

The method for processing municipal solid waste to solid recovered fuel pellets without sorting out chlorine containing materials and subsequent torrefaction of the pellets according to the present invention, comprises the following steps:

a) providing a solid waste comprising municipal solid waste;
b) shredding the entirety of the solid waste to a shredded solid waste;
c) applying a magnetic field to the shredded solid waste to remove ferromagnetic particles;
d) drying the shredded solid waste;
e) eddy current separating of non ferrous metals from the shredded solid waste;
f) removing further residues by a density classifier generating a pre-cleaned material stream;
g) milling the pre-cleaned material stream to a milled material stream;
h) pressing the milled material stream to solid recovered fuel pellets; and
using the solid recovered fuel pellets in a torrefaction with temperatures between 250° C. and 300° C.

The steps a) to h) are performed in chronological order. The solid waste in step a) comprises municipal solid waste The shredding in step b) results in a maximum particle size of 80 mm. Here, the entirety of the solid waste is shredded, no fraction is separated before the process is started. In particular, no high chlorine components, e.g. PVC, are separated In step c) the shredded solid. Furthermore, no finer fractions typically high in heavy metals, moisture, ash and biogenic fraction are separated upstream the shredding step. In step c) a magnetic field is applied, e.g. by an electromagnet. By this magnetic field ferromagnetic particles, in particular ferrous metal particles, are removed from the shredded solid waste.

The drying step d) reduces the moisture content in the solid recovered fuel pellets which is advantageous for further use of the solid recovered fuel pellets, e.g. in a torrefaction and gasification process to produce a hydrogen enriched syngas and/or a pure carbon dioxide stream as a feedstock for other processes. The drying heat in step d) is preferably supplied by recycling the heat of evaporation in the moisture laden exhaust air via a washing column and an electrical heat pump system as disclosed e.g. in EP 3 184 946 A. In particular, the drying step is controlled in such a way that a moisture content of 10 wt.-% and less is generated in the shredded solid waste downstream the drying step.

In step e) an eddy current separator combined with a second magnet is used to separate non-ferrous metals, in particular metals based on copper, aluminum, and zinc. The further residues of step f) include i.a. minerals like e.g. glass, stone, and/or ceramics and other materials such as stainless steel.

The milling in step g) preferably is performed using a low RPM shredder. Preferably, a maximum particle diameter of 30 mm [Millimeter], in particular of 25 mm is reached in the milled material stream due to the milling process in step g). This ensures a reliable pressing of solid recovered fuel pellets in step h).

In step h) the reliably solid recovered fuel pellets are generated. This is due to the exact moisture content in the milled material stream as well as the precise particle size in the milled material stream.

The solid recovered fuel pellets generated in the steps a) to h) are in particular useful in the torrefaction and gasification. With the moisture content provided in step d) a high output torrefaction and gasification can be ensured. I.e. a use of the municipal solid waste with respect to a high hydrogen and/or high carbon dioxide yield in a subsequent torrefaction and gasification of the solid recovered fuel pellets is possible.

The further use of the solid recovered fuel pellets in a torrefaction with temperatures between 250° C. and 300° C. resulting in a substoichiometric oxidation of the solid recovered fuel pellets, i.e. a charring process of the solid recovered fuel pellets. The resulting charred pellets are subsequently dry feed entrained flow gasified whereas the resulting gases are processed separately, in particular using an atmospheric thermal cracking process. The term torrefaction in is understood as a thermochemical treatment of the solid recovered fuel pellets at temperatures of 250° C. to 320° C. It is carried out under atmospheric pressure and without adding further oxygen, e.g. without providing air. During the torrefaction process water contained in the solid recovered fuel pellets evaporates as do volatiles included in the SRF pellets. Biopolymers included in the SRF pellets partly decompose under release of volatiles. The product of the torrefaction process are charred pellets and torrefaction gas.

The substoichiometric oxidation of the solid recovered fuel pellets the formation of oxides from heavy metals is suppressed. Instead, sulfides of heavy metals are generated which are insoluble in water, compared to the more volatile and well soluble metal oxides and chlorides the generation of which is favored in oxidizing atmospheres. Consequently, the chlorine-, ash- and heavy metal contents in the present approach are less critical. Therefore, a front-end separation of high chlorine compounds and heavy metal compounds can be avoided without impact on the environment.

According to a preferred embodiment, in step d) a moisture content of the shredded solid waste is adjusted to 5 to 10 wt.-%. A moisture content in this range allows for a stable pressing step and allows a stable and reliable torrefaction of the solid recovered fuel pellets.

According to a preferred embodiment in step d) the drying is performed in a kiln which is heated by air being guided downstream of the kiln through a washing column which is thermally connected to a heat pump for energy recovery. This allows a stable and energy efficient heating of the kiln and, therefore, a well defined drying process for the shredded solid waste having a well defined moisture content downstream the kiln.

According to a further aspect a pelletizing facility for processing solid waste comprising municipal solid waste to solid recovered fuel pellets is proposed, comprising the elements:
  A) a shredder for shredding the entirety of the solid waste to a shredded solid waste;
  B) a first metal removal unit including a magnet;
  C) a dryer for drying the shredded solid waste;
  D) a second metal removal unit comprising an eddy current separator and a second magnet;
  E) a density classifier;
  F) a mill; and
  G) a pellet press;
  wherein the elements are arranged and connected such, that the solid waste is conveyable through the elements A) to G) in alphabetical order.

According to the present invention, said pelletizing facility is part of a facility, further comprising a torrefaction unit for sub-stoichiometric oxidization of the pellets generatable in the pellet press. The pelletizing facility processes the solid waste comprising municipal solid waste to solid recovered fuel pellets according to the method according to the present invention.

According to a preferred embodiment the dryer comprises a kiln which is heated by air being guided downstream of the kiln through a washing column which is thermally connected to a heat pump for energy recovery.

Figure 2:
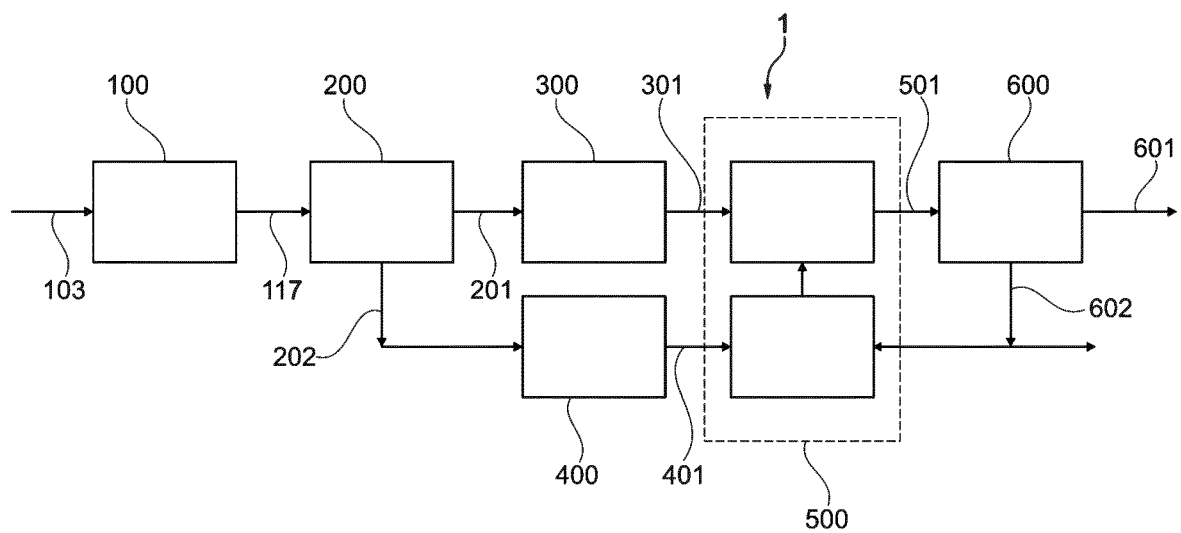

It should be noted that the individual features specified in the claims may be combined with one another in any desired technologically reasonable manner and form further embodiments of the invention. The specification, in particular taken together with the figures, explains the invention further and specifies particularly preferred embodiments of the invention. Particularly preferred variants of the invention and the technical field will now be explained in more detail with reference to the enclosed figures. It should be noted that the exemplary embodiment shown in the figures is not intended to restrict the invention. The figures are schematic and may not be to scale. the figures display:

FIG. 1 a visualization of a pelletizing facility;
FIG. 2 an example of the pelletizing facility included in a method for preparing hydrogen from solid wastes; and
FIG. 3 an example of a dryer used in the pelletizing facility.

According to FIG. 1 a pelletizing facility 100 includes a shredder 102. Solid waste 103, e.g. municipal solid waste (municipal solid waste) and/or biomass, are provided to the shredder 102, generating shredded solid waste 104 which is conveyed by a first metal removal unit 105 including a magnet to remove the iron residues 106 from the shredded solid waste 104. Thereafter, the shredded solid waste 104 is provided to a dryer 107 in which water 108 is removed from the shredded solid waste 104. The shredded solid waste 104 is then conveyed to a second metal removal unit 109 for removing metal residues 110 from the shredded solid waste 104, the second metal removal unit 109 comprising a second magnet 139 for further removing iron metals and an eddy current to remove non-iron metals.

Thereafter, minerals as well as stainless steel are removed as further residues 111 in a density classifier 112. In the density classifier 112 high density residues like stainless steel particles, that can neither be removed with a magnet nor an eddy current, are removed based on the density differences between the further residues 111 and the remainder of the shredded solid waste 104. Same holds for minerals like glass or stone that are removed from the remainder of the shredded solid waste 104 by virtue of its density difference. Preferred examples for density classifiers 112 are e.g. air classifiers.

After removal of the further residues 111 the shredded solid waste 104 has been stripped from the iron metals (such as iron residues 106 and metal residues 110), the non-iron metals, stainless steel and minerals as further residues 111 like as well as moisture in the form of water 108. The remainder of the shredded solid waste 104 is basically identical to the solid waste 103 that has been input to the pelletizing facility 100. In particular, in the present pelletizing facility 100 it is not necessary to sort out e.g. fine fractions of the solid waste 103 or chlorine containing materials like e.g. Polyvinyl chloride (PVC) or the like. This means the ratio of mass of the pre-cleaned material stream 113 which is present downstream of the first metal removal unit 105, the second metal removal unit 109, and the density classifier 112 to the mass of the solid waste 103 input into the pelletizing facility 1 is larger than for known approaches.

The pre-cleaned material stream 113 is, thereafter milled in a mill 114, in particular to mean particle sizes of less than 25 mm to generate a milled material stream 115. Subsequently, the milled material stream 115 is introduced to a pellet press 116 to generate solid recovered fuel pellets 117.

FIG. 2 displays schematically the pelletizing facility 100 in which the solid recovered fuel pellets 117 are provided to a plant 1 for conversing solid waste into a gas comprising hydrogen, in particular into syngas comprising hydrogen and hydrogen. After preparing pellets from solid waste like municipal solid waste 103 and/or biomass in the pelletizing facility 100 the respective pellets 117 are transported to the plant 1 and are provided to a torrefaction unit 200 in which the pellets are oxidized sub stoichiometrically at temperatures of 250° C. to 300° C. The torrefaction of the pellets results in charred pellets 201, which are gasified in a gasifying unit 300. Another product of the torrefaction is torrefaction gas 202 which is provided to a torrefaction gas processing unit 400. The product both of the torrefaction gas processing unit 400 and the gasifying unit 300 is a syngas 301, 401 comprising water steam, carbon monoxide and hydrogen. Both syngases 301, 401 are introduced into a CO shift unit 500 in which carbon monoxide (CO) is reacting with water steam ($H_2O$) to carbon dioxide ($CO_2$) and hydrogen ($H_2$). Shifted syngas 501 with increased hydrogen content compared to the syngases 301, 401 which is generated in the CO shift unit 500 and is transferred to a gas cleaning unit 600 which separates a product gas stream rich in hydrogen 601, preferable having a hydrogen content from 99.5 vol.-% and more from a purge gas 602. The pelletizing facility 100 is preferably off-site, i.e. situated not in the same location than the plant 1 for conversing solid waste into a gas comprising hydrogen. The pelletizing facility 100 being off-site is advantageous, as it reduces the mass of the municipal solid waste, as usually about 30 to 35 wt.-% of water content of the municipal waste are evaporated. This reduces the mass to be transported significantly. Furthermore, the footprint of the chemical plants such as the plant 1 can be reduced as the pelletizing facility 100 allows a central production of solid recovered fuel pellets and the subsequent transport of these pellets to the chemical plant where needed.

Figure 3:
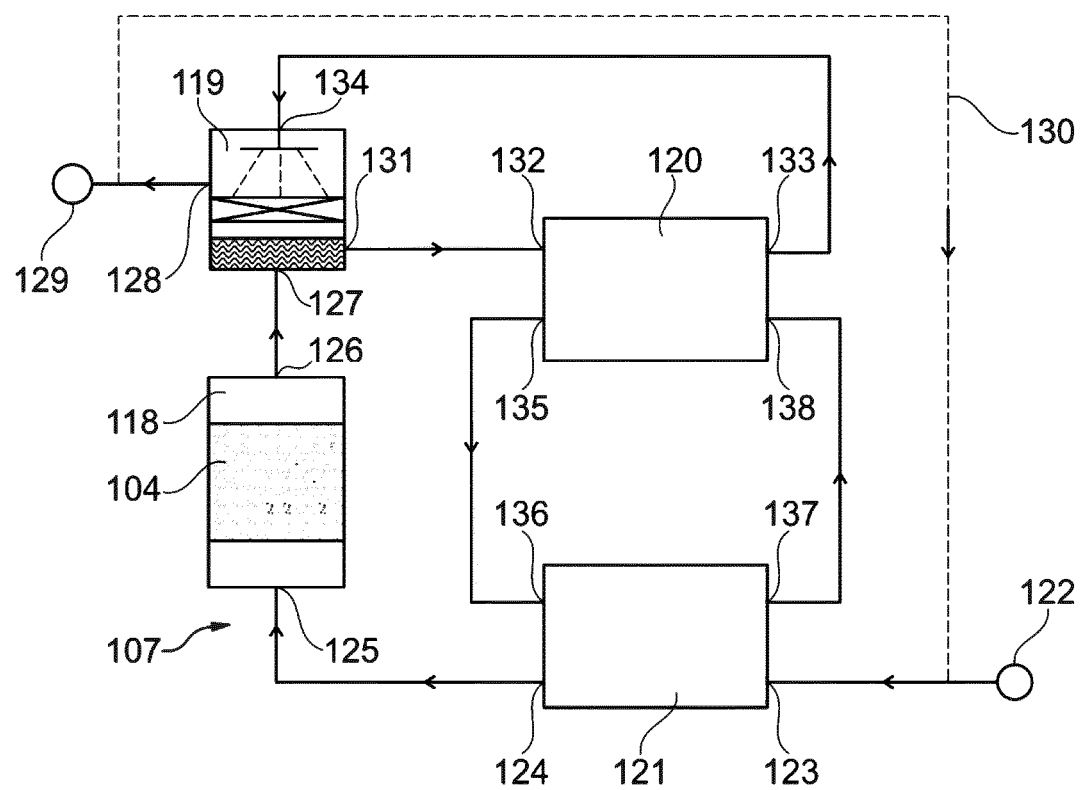

FIG. 3 displays an example of a dryer 107 used in a pelletizing facility 100 as in FIG. 1. The dryer 107 for drying shredded solid waste 104 comprises a kiln 118 for accommodating the shredded solid waste 104, a washing column 119 which also can be named a scrubber, a heat pump 120 and a radiator 121. Air is sucked into the dryer 107 through a dryer air inlet 122 which is usually fluidly connected with the atmosphere. The sucked in air can be conveyed to the radiator 121 via a vent which is not shown in FIG. 3. The dryer air inlet 122 is fluidly connected with a radiator air inlet 123 of the radiator 121 via a duct. The air conveyed into the radiator 121 is heated in the radiator 121 and exits the radiator 121 via a radiator air outlet 124. The heated air is conveyed towards the kiln 118, wherein a kiln air inlet 125 is fluidly connected with the radiator air outlet 124 via a duct. The shredded solid waste 104 is arranged inside the kiln 118 and the air conveyed into the kiln 118 flows through the shredded solid waste 104 and exits the kiln 118 via a kiln air outlet 126. The temperature of the air entering the kiln 118 in a drying process is approximately 80° C., wherein the air exiting the kiln 118 exhibits a temperature of about 45° C. The relative humidity of the air exiting the kiln 118 is approximately 100%.

The kiln 118 is in fluid communication with the washing column 119, wherein the kiln air outlet 126 is fluidly connected with a washing column air inlet 127. Inside the washing column 119 the air is brought into close contact with cold water. Thereby, the moist and warm air is cooled down so that the humidity of the air is condensed out and latent heat is transferred into sensible heat of the water. This results into a heating of the water from approximately 18° C. to approximately 25° C. to 28° C. and a cooling of the air from about 28° C. to 32° C. to approximately 22° C. to 24° C. The cooled air exits the washing column 119 via a washing column air outlet 128 which is in fluid communication with a dryer air outlet 129.

The air exiting the washing column 119 also can be conveyed to the dryer air inlet 122 via a recirculation line 130, so that the washing column air outlet 128 is fluidly connected with the dryer air inlet 122. A corresponding arrangement results in a lower energy consumption of the device 100. The recirculation line 130 is not necessarily included in the device 100 and can be left out.

With regard to the airflow the radiator 121 is positioned downstream of the dryer air inlet 122, the kiln 118 is positioned downstream of the radiator 121, the washing column 119 is positioned downstream of the kiln 118 and the dryer air outlet 129 is positioned downstream of the washing column 119.

The washing column 119 also comprises a washing column water outlet 131 which is fluidly connected with a first heat pump water inlet 132. A first heat pump water outlet 133 is fluidly connected with a washing column water inlet 134. Therefore, water is circulated between the washing column 119 and the heat pump 120. The water can be conveyed via a pump which is not shown in FIG. 3.

The water is heated in the washing column 119 via the air entering the washing column 119 via the washing column air inlet 127 and the heated water exits the washing column 119 via the washing column water outlet 131 and enters the heat pump 120 via the first heat pump inlet 132. The heat energy of the water entering the heat pump 120 then is transferred to another heat cycle which is realized between the heat pump 120 and the radiator 121. The water entering the heat pump 120 exhibits a temperature of about 26° C. to 28° C. and the water exiting the heat pump 120 via the first heat pump outlet 133 exhibits a temperature of approximately 18° C.

The first heat pump outlet 133 is fluidly connected with a washing column water inlet 134. Therefore, the water cooled inside the heat pump 120 enters the washing column 119 via the washing column water inlet 134. Therefore, a heat cycle between the washing column 119 and the heat pump 120 is realized, wherein thermal energy of the water exiting the washing column 119 is transferred via the heat pump 120 to a second heat cycle between the heat pump 120 and the radiator 121.

A second heat pump outlet 135 is fluidly and therefore thermally connected with a radiator water inlet 136 and a radiator water outlet 137 is fluidly and therefore thermally connected with a second heat pump inlet 138. The water is thereby conveyed via pumps which are not shown in FIG. 3 between the heat pump 120 and the radiator 121. Consequently, a second heat cycle is realized between the heat pump 120 and the radiator 121. Thermal energy from water exiting the washing column 119 is transferred via the heat pump 120 to the radiator 121 and to air flowing through the radiator 121 from the radiator air inlet 123 to the radiator air outlet 124.

The pelletizing facility 100 according to the present invention allows the manufacture of solid recovered fuel pellets from municipal solid waste without separating parts of the municipal solid waste before starting the pelletizing process. Thus, a higher amount of the municipal solid waste can actually be used to manufacture solid recovered fuel pellets. The pelletizing facility 100 as well as the method according to the invention can be used in particular to manufacture solid recovered fuel pellets that can be used in the production of hydrogen and/or carbon dioxide enriched syngas by a torrefaction of the solid recovered fuel pellets with a subsequent gas treatment.

REFERENCE NUMERALS 1 plant for conversing solid waste into a gas comprising hydrogen
100 pelletizing facility
102 shredder 103 solid waste
104 shredded solid waste
105 first metal removal unit
106 iron residues
107 dryer
108 water
109 second metal removal unit
110 metal residues
111 further residues
112 density classifier
113 pre-cleaned material stream
114 mill
115 milled material stream
116 pellet press
117 solid recovered fuel pellet
118 kiln
119 washing column
120 heat pump
121 radiator
122 dryer air inlet
123 radiator air inlet
124 radiator air outlet
125 kiln air inlet
126 kiln air outlet
127 washing column air inlet
128 washing column air outlet
129 dryer air outlet
130 recirculation line
131 washing column water outlet
132 first heat pump inlet
133 first heat pump outlet
134 washing column water inlet
135 second heat pump outlet
136 radiator water inlet
137 radiator water outlet
138 second heat pump inlet
139 second magnet
200 torrefaction unit
201 charred pellets
202 torrefaction gas
300 gasifying unit
301 first syngas stream
400 torrefaction gas processing unit
401 syngas
500 CO shift unit
501 shifted syngas
600 gas cleaning unit
601 product gas rich in hydrogen
602 purge gas

The invention claimed is:

1. A method for processing municipal solid waste to solid recovered fuel pellets (117) without sorting out chlorine containing materials and subsequent torrefaction of the pellets (117), comprising the following steps:
   a) providing a solid waste (103) comprising municipal solid waste;
   b) shredding the entirety of the solid waste (103) to a shredded solid waste (104);
   c) applying a magnetic field to the shredded solid waste (104) to remove ferromagnetic particles;
   d) drying the shredded solid waste (104);
   e) eddy current separating of non ferrous metals from the shredded solid waste (104);
   f) removing further residues (111) by a density classifier (112) generating a pre-cleaned material stream (113);
   g) milling the pre-cleaned material stream (113) to a milled material stream (115);
   h) pressing the milled material stream (115) to solid recovered fuel pellets (117); and using the solid recovered fuel pellets in a torrefaction with temperatures between 250° C. and 300° C.

2. A method according to claim 1, wherein in step d) a moisture content of the shredded solid waste (104) is adjusted to 5 to 10 wt.-%.

3. A method according to claim 1, wherein in step d) the drying is performed in a kiln (118) which is heated by air being guided downstream of the kiln (118) through a washing column (119) which is thermally connected to a heat pump (120) for energy recovery.

4. A facility, including a pelletizing facility (100) for processing solid waste (103) comprising municipal solid waste to solid recovered fuel pellets (117), comprising the elements:
   A) a shredder (102) for shredding the entirety of the solid waste (103) to a shredded solid waste (104);
   B) a first metal removal unit (105) including a magnet;
   C) a dryer (107) for drying the shredded solid waste (104);
   D) a second metal removal unit (109) comprising an eddy current separator and a second magnet (139);
   E) a density classifier (112);
   F) a mill (114); and
   G) a pellet press (116);
   wherein the elements are arranged and connected such, that the solid waste (103) is conveyable through the elements A) to G) in alphabetical order, further comprising a torrefaction unit (200) for substoichiometric oxidization of the pellets (117) generatable in the pellet press (116).

5. A facility (100) according to claim 4, wherein the dryer (107) comprises a rotating kiln (118) which is heated by air being guided downstream of the rotating kiln (118) through a washing column (119) which is thermally connected to a heat pump (120) for energy recovery.

* * * * *